(12) United States Patent
Errington et al.

(10) Patent No.: US 7,866,169 B2
(45) Date of Patent: Jan. 11, 2011

(54) SYSTEM AND METHOD FOR VEHICLE DEFOGGING CONDITION CALCULATION AND CONTROL

(75) Inventors: Bradley C. Errington, Bellefontaine, OH (US); Junichi Kanemaru, Upper Arlington, OH (US)

(73) Assignee: Honda Motor Co., Ltd., Tokyo (JP)

( * ) Notice: Subject to any disclaimer, the term of this patent is extended or adjusted under 35 U.S.C. 154(b) by 333 days.

(21) Appl. No.: 12/119,115

(22) Filed: May 12, 2008

(65) Prior Publication Data
US 2008/0209923 A1   Sep. 4, 2008

Related U.S. Application Data

(62) Division of application No. 10/881,406, filed on Jun. 30, 2004, now Pat. No. 7,392,838.

(51) Int. Cl.
*F25D 17/06* (2006.01)
(52) U.S. Cl. .......................................... 62/89; 62/176.1
(58) Field of Classification Search ............... 62/89, 62/176.1, 176.2, 176.3, 133
See application file for complete search history.

(56) References Cited

U.S. PATENT DOCUMENTS

| | | | |
|---|---|---|---|
| 6,625,995 B2 | 9/2003 | Remond et al. | |
| 7,102,501 B2 | 9/2006 | Lo Presti et al. | |
| 7,690,421 B2 * | 4/2010 | Burns et al. | 165/237 |

* cited by examiner

*Primary Examiner*—Melvin Jones
(74) *Attorney, Agent, or Firm*—Mark E. Duell; Rankin Hill & Clark LLP

(57) ABSTRACT

A method and apparatus for controlling a vehicle HVAC system to automatically defog a windshield glass and to prevent fogging or condensation of the windshield glass. The ambient air temperature and vehicle speed are measured and used to determine a windshield glass temperature. The in-cabin air temperature and relative humidity are measured and used to determine a dewpoint. An dewpoint margin is calculated to compensate for sensor accuracy and fog predictability. A fog margin, which is based upon calculated windshield glass temperature and dewpoint, is calculated and used, in conjunction with the dewpoint margin, to control the HVAC system to anticipate potential fogging conditions and to scale the intensity of the HVAC system response based upon the severity of fogging conditions.

10 Claims, 4 Drawing Sheets

SYSTEM AND METHOD FOR VEHICLE DEFOGGING CONDITION CALCULATION AND CONTROL

BACKGROUND OF THE INVENTION

1. Field of the Invention

The present invention relates to vehicle environmental control systems and methods and, more particularly, toward methods and systems for automatically sensing fogging conditions, and instituting appropriate measures to prevent fogging and to remove window fog should fog be present.

2. Description of Related Art

In conventional automobile control systems, application of remedial measures to combat fogging of the vehicle windows is manually instituted by the vehicle passengers. Naturally, such remedial measures, which primarily consist of activating a vehicle heating, ventilation, and air conditioning (HVAC) system into a defrost mode of operation, are employed after a fogging condition has developed, and typically require some time to alleviate the fogging condition. As will be appreciated, such systems are not suitable for automatic control, and do not anticipate impending fogging conditions.

In vehicles incorporating an automatic HVAC control system, it has been proposed to sense internal and external conditions to determine whether fogging is likely. Such known systems include a glass temperature sensor and a humidity sensor. The glass temperature sensor is affixed to an internal surface of the windshield glass, and the humidity sensor is disposed adjacent to the windshield glass. The system uses the sensed glass temperature and the sensed cabin humidity to determine whether a possible fogging condition exists, and actuates the HVAC system in response thereto. Unfortunately, such automated systems require additional sensors, which are expensive to purchase and require significant amounts of labor to install and electrically connect to the HVAC controller.

Therefore, there exists a need in the art for a method and system for anticipating fogging conditions within a vehicle cabin that is less expensive, that does not require additional sensors, and which will provide improved response to, and prevention of, fogging conditions.

SUMMARY OF THE INVENTION

The present invention is directed toward a method and apparatus to prevent fogging conditions from occurring in a vehicle, and for responding to fogging conditions that do occur in a vehicle.

In accordance with one aspect of the invention, a method and apparatus for calculating a vehicle windshield glass temperature is provided. The method employs existing sensors and calculates or estimates the glass temperature based upon the vehicle speed and the ambient temperatures. The sensed speed and ambient temperatures are input into a computer-based lookup table and correlated to experimentally determined windshield temperatures.

Further according to the present invention, a method and apparatus for determining a control parameter, which may be used by a vehicle HVAC system to adjust an intensity of the HVAC system response, is provided. The control parameter, fog margin, is calculated based on a dewpoint of air within the vehicle cabin and the calculated windshield glass temperature, and is indicative of the quality of the threat of condensation or fog formation on the windshield glass. The HVAC system is controlled based upon the fog margin to provide a response that is correlated to the condensation threat.

In further accordance with the present invention, a method and apparatus for controlling a vehicle HVAC system to automatically defog a windshield glass and to prevent fogging or condensation on the windshield glass. The ambient air temperature and vehicle speed are measured and used to determine a windshield glass temperature. The in-cabin air temperature and relative humidity are measured and used to determine a dewpoint. A dewpoint margin is calculated to compensate for sensor accuracy and fog predictability. The fog margin, which is based upon calculated windshield glass temperature and dewpoint, is calculated and used, in conjunction with the dewpoint margin, to control the HVAC system to anticipate potential fogging conditions and to scale the intensity of the HVAC system response in accordance with the severity of fogging conditions.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1B:
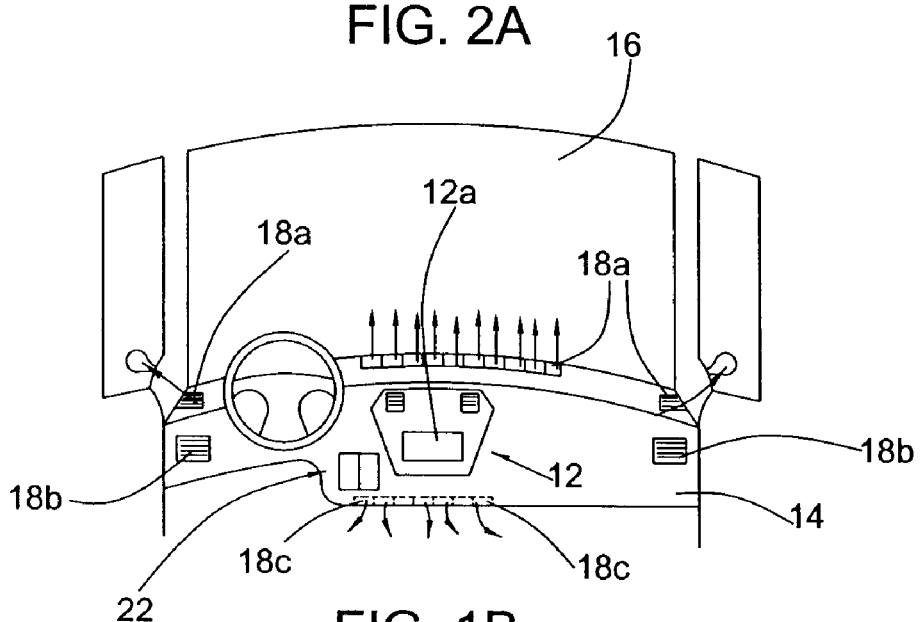
FIG. 1B is a schematic view of a vehicle interior incorporating the present invention.
Figure 1A:
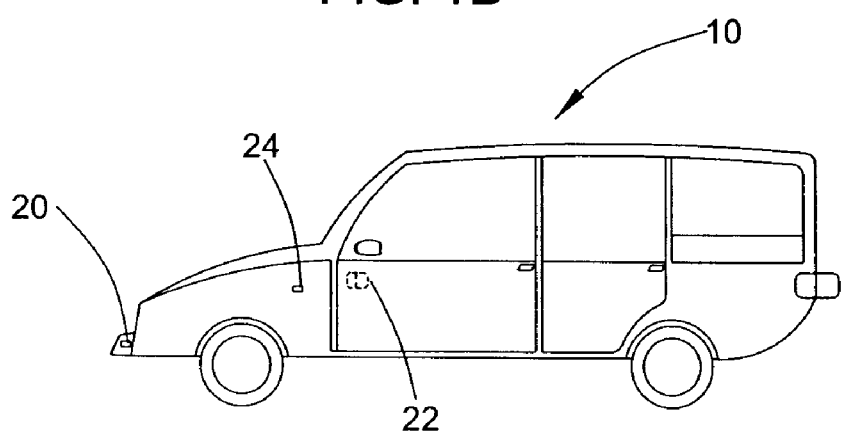
FIG. 1A is a schematic drawing of a vehicle incorporating the system and implementing the method for vehicle defogging condition calculation and control according to the present invention.

With reference to FIGS. 1A-1B, a vehicle 10 incorporating the automatic defogging system of the present invention is schematically illustrated. As will be appreciated, the automatic defogging system is incorporated into the vehicle's computer based heating, ventilation, and air conditioning (HVAC) system, which preferably includes several modes of operation. The automatic defogging system, as part of the HVAC system and as described hereinafter, is intended to be operational when the HVAC system is operated in an automatic mode of operation and to operate seamlessly as one step or sequence of steps during the automatic mode of operation.

In such an automatic mode, the user sets a desired cabin temperature and the computer or controller of the HVAC system makes necessary calculations, in response to signals from various sensors and one or more predefined programs defining operational characteristics of the HVAC system, tuned to the inherent physical characteristics of the vehicle. During the automatic HVAC control mode, the activation of the air conditioning (A/C), vent control or activation, and fan speed modulation is automatically controlled in accordance with a computer algorithm that is stored in the HVAC computer of controller.

The present invention introduces one or more further algorithms, to be described hereinafter, that will be used in conjunction with existing algorithms used during control of the HVAC system in the automatic mode of operation. The one or more further algorithms of the present invention, described hereinafter, are designed to automatically calculate condensation or fogging conditions, and to appropriately activate the HVAC system (A/C power, vent control, fan speed) in response thereto. Further, as will be apparent from the following discussion, in accordance with the present invention the intensity of the HVAC system response are scaled in response to the level of the condensation or fog threat. Insofar as the basic operational characteristics of HVAC systems is generally well known in the art, such basic operational characteristics and methods will only be described hereinafter as they relate to the automatic fogging condition sensing system and method of the present invention.

The vehicle 10 has a body defining a passenger compartment or cabin, an HVAC control and display panel 12 disposed in the dashboard 14 at a front of the passenger compartment, and a series of windows including a windshield 16. The HVAC control and display panel 12 may be a series of individual pushbuttons or, preferably, may be provided as a touch screen 12a wherein the user may control operation of the HVAC system via one or more on-screen menus. For example, the user may select the mode of operation (full auto/semi-auto/manual); air conditioning (A/C) operation; fresh air/recirculation; as well as select air flow or vent output (i.e. via defrost vents 18a, dashboard vents 18b, floor vents 18c, or one or more combinations when in the manual or semi-auto mode of operation) in addition to a desired cabin temperature setpoint. When in a full-auto mode of operation, the user generally inputs the desired cabin temperature setpoint and the HVAC system responds to sensed conditions in accordance with a predetermined computer algorithm to appropriately activate the HVAC system. Naturally, the touch screen 12a may provide various other functions, such as a navigation screen and entertainment center, as is well known in the art.

Further, and as will be appreciated by those skilled in the art, due to the air passing over the windshield glass 16 during operation of the vehicle 10, the windshield glass 16 is typically at a different temperature than the remaining windows, and may usually be at a different temperature than the ambient air during operation of the vehicle, especially when the vehicle is driven at high speeds. It is conventional in vehicles to constantly bleed air to the defrost vents and, due this fact, the windshield glass 16 may be considered to be less susceptible to development of fogging conditions than would otherwise be the case.

The vehicle 10 further includes an ambient temperature sensor 20, which may be disposed at a relatively forward position on the vehicle 10, and may be disposed within the front bumper area, if desired. Naturally, it is known in the art that various locations for the ambient temperature sensor may be selected, and therefore the present invention is not limited to the currently preferred ambient temperature sensor position illustrated herein. It is noted that ambient temperature sensors are now commonly provided on vehicles, and are used, for example, to permit the operator to display the ambient temperature on a screen or display panel, such as the HVAC control and display panel 12.

The vehicle 10 also includes an integrated cabin temperature and humidity sensor module or assembly 22, which preferably is disposed in the vehicle dashboard adjacent the HVAC control and display panel 12, as illustrated in FIG. 1B. An integrated cabin temperature and humidity sensor assembly 22 such as sold by Denso Corporation is preferred for various reasons.

For example, the integrated assembly is available at significantly reduced costs as compared to individual or separate sensors. Moreover, with a single sensor module sensing both temperature and humidity within the cabin, the in-cabin physical conditions necessary to detect and respond to possible fogging conditions, as described hereinafter, are derived from a single location, leading to repeatable and consistent results for any given vehicle model. It is also believed that locating the integrated assembly 22 at this relatively shielded location on the dashboard 14 prevents random environmental influences, such as solar load, from impacting the operation of the sensors. Further, the integrated sensor assembly 22 is disposed in a location that is relatively easy to install and electrically connect to the HVAC control system via a conventional wiring harness, without the need to introduce additional steps to the assembly process.

Nevertheless, it is considered apparent that, with regard to some aspects of the invention, use of the preferred integrated sensor assembly is not mandatory, but rather separate sensors, disposed adjacent to one another, could be used with equal functionality, albeit more expensive to manufacture and assemble. Further, although it is preferred that the temperature and humidity sensors be disposed in the front dashboard, this location is not necessarily mandatory. Rather, the sensors could be moved to any number of locations within the vehicle. Relatively forward locations within the cabin may be considered more desirable since preventing or alleviating windshield fogging is one aspect of the present invention.

However, while it has been found that it is important that the temperature and humidity sensing is performed at the same location (to determine dewpoint, which is rather constant within the cabin), so long as appropriate calibration is performed, the temperature and humidity sensors can be disposed at any location within the vehicle cabin. For example, the sensors may be disposed in the rear of the cabin or on the center console between the front seats.

Dewpoint is the temperature at which water in the air will condense. The dewpoint is related to humidity, with it being recognized that as the humidity increases the dewpoint (temperature at which the water in the air will condense) also increases.

In this regard it is noted that humidity is a percentage falling within the range between 0%, which is a total absence of water in the air, and 100%, which is a totally saturated condition. Thus, humidity may sometimes be referred to as absolute humidity.

Relative humidity, on the other hand, is the ratio of the amount of water in the air at a given temperature to the maximum amount of water the air could hold at that temperature, and is expressed as a percentage. Therefore, relative humidity is adjusted to compensate for the temperature-dependent ability of air to hold water. Thus, there is a strict and well known relationship between ambient temperature, relative humidity, and dewpoint. Essentially, given the relative humidity and the ambient temperature the dewpoint may be easily derived.

The present invention takes advantage of this fact, and calculates the dewpoint based upon the sensed cabin temperature and the sensed relative humidity in the cabin provide by the integrated sensor assembly. Preferably, this information is stored in a lookup table in the HVAC controller or computer such that, by inputting the sensed cabin temperature and relative humidity, a corresponding dewpoint is output and used for further calculations, as will be apparent from the following discussion.

It is understood and well known that water within air will condense on a surface that is at or below the dewpoint. Thus, it is necessary to determine the windshield glass temperature in order to determine whether condensation (fog) will form on the windshield glass 16. As noted hereinbefore, it is possible to directly measure the windshield glass temperature. However, direct measurement requires additional sensors(s), which are expensive and difficult to install and replace, and require modifications to existing structures (i.e., dashboard assemblies) as well as existing assembly processes. Therefore separate windshield temperature sensor(s) are not currently preferred.

The present inventors have found that, for any given vehicle 10, when the cabin temperature is above a predetermined temperature (indicative of the vehicle being warm), the temperature of the windshield glass 16 is a function of the ambient temperature existing outside the vehicle 10 and the vehicle speed. When the cabin temperature is below the predetermined temperature (indicative of the vehicle being cold), the windshield glass temperature is essentially equal to the ambient temperature. In one vehicle tested by the inventors, the predetermined temperature was found to be 15° C.

Thus, assuming the vehicle cabin temperature is above the predetermined temperature, it is possible, for any given vehicle, to estimate the windshield glass temperature based upon the ambient temperature (provided by the ambient temperature sensor 20) and the vehicle speed (provided by a speed sensor 26). Further, assuming the vehicle cabin temperature is below the predetermined temperature, the windshield glass temperature is determined to be equal to the sensed ambient temperature. The present invention takes advantage of this fact, and calculates or estimates the windshield glass temperature in response to sensed cabin temperature as being either a function of the ambient temperature and the vehicle speed, or a function of the ambient temperature.

Notably, the windshield glass temperature calculation provided by the present invention does not require any additional sensors, but rather takes advantage of sensors (ambient temp, cabin temp, and speed) that are already conventionally provided by the vehicle 10 and, as such, adds functionality to the vehicle without increasing the component cost thereof. Preferably, with regard to the calculation of glass temperature as a function of ambient temperature and vehicle speed, for the particular vehicle model this information is stored in a lookup table in the HVAC controller or computer such that, by inputting the ambient temperature and vehicle speed, a corresponding windshield glass temperature is output and used for further calculations, as will be apparent from the following discussion.

In a simplified control system it would seem apparent that, based upon the definition of 'dewpoint', so long as the windshield glass temperature is greater than the dewpoint, no condensation or fog will form and, conversely, when the glass temperature is equal to or below the dewpoint, a fogging condition exists (i.e., condensation or fog will form on the glass). Therefore, it would be possible to control the HVAC system so that an appropriate mode of operation (A/C and/or defrost) is activated when the glass temperature is equal to or less than the dewpoint. Such a control system may work satisfactorily in some situations, and definitely provides a better result than the HVAC system lacking fog condition calculations.

However, the inventors have found that the calculation of dewpoint and glass temperature to anticipate condensation or fogging conditions, which is clearly based upon theoretically valid estimations, does not result in optimum control over, or prevention of, fogging conditions. Moreover, the inventors have further found that the aforementioned calculation does not anticipate the possibility or probability of an impending fogging condition, but rather may only be operable to respond when conditions are suitable for condensation (fog).

Therefore, the use of the comparison of calculated dewpoint with calculated windshield glass temperature to control the HVAC system is believed to only be operable, at best, to respond to a currently existing fogging condition, and does not prevent the fogging condition from occurring in the first place. Therefore, a control system relying solely upon this comparison will be reactive, rather than proactive, to fogging conditions. Moreover, it has been found by experimentation that the comparison of calculated dewpoint with calculated windshield glass temperature to control the HVAC system is imperfect, and may not always provide a result indicative of a fogging condition when a fogging condition actually exists.

It is believed that this deficiency is the result of various environmental variables (solar load, wind, rain, snow, etc.) as well as inherent inaccuracies of the sensors (e.g., humidity, temperature sensors) that are used.

In tests conducted by the inventors, it was found that there exists, for a given ambient temperature and glass temperature, a difference between the calculated humidity at which condensation or fog results and the actual humidity at which fog results. This difference is referred to as 'fog predictability' hereinafter. The fog predictability is preferably experimentally determined and serves as a constant that is used to calculate a humidity margin, as described hereinafter.

In further tests conducted by the inventors, it was found that accuracy of the humidity sensor (referred to as humidity sensor accuracy hereinafter) also contributed to the accuracy of determining the relative humidity, and thus, dewpoint within the cabin. The sensor accuracy is given by the manufacturer and can also be experimentally determined by basic sampling techniques. Therefore, the sensor accuracy is another constant that is used to determine the humidity margin.

Thus, it was found that these inaccuracies (fog predictability and sensor accuracy) are significant, and result in the improper estimation of the relative humidity, which caused an inaccurate calculation of the dewpoint. In order to compensate for these inaccuracies an adjustment or correction of the sensed relative humidity, referred to hereinafter as the humidity margin, is calculated using the equation:

$$\text{Humidity Margin}(\%) = \text{Fog Predictability}(\%) + \text{Sensor Accuracy}(\%) \quad (1)$$

Figure 2A:
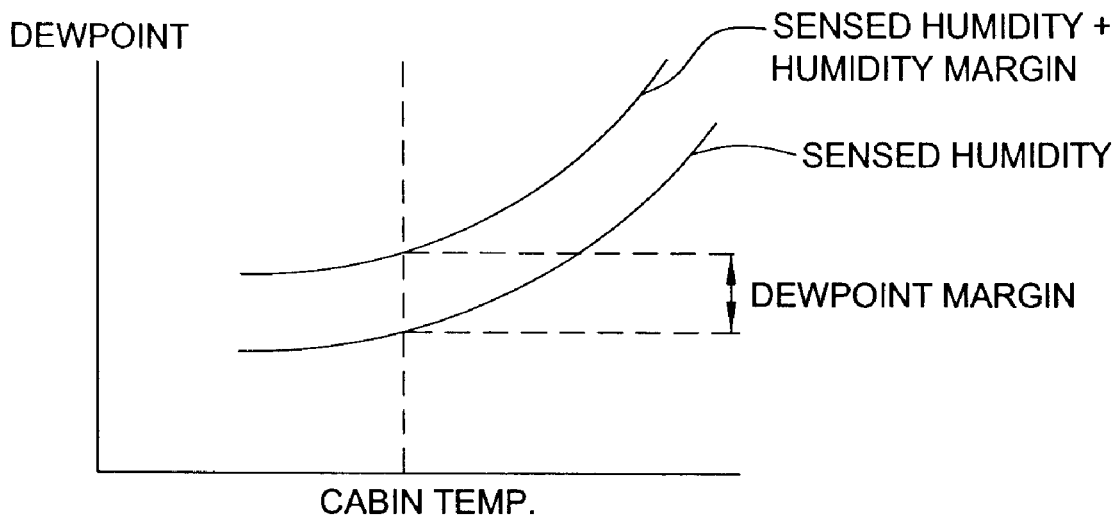
FIG. 2A is a chart illustrating cabin temperature versus dewpoint and illustrating calculation of dewpoint margin.
Figure 2B:
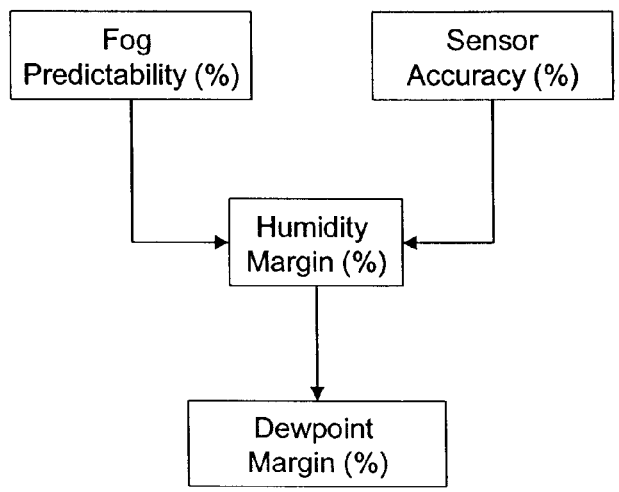
FIG. 2B is a flowchart illustrating a method of determining a dewpoint margin based upon fog predictability and sensor accuracy.

With reference to FIG. 2A, which is a chart of cabin temperature v. dewpoint, it is shown that a correction of the sensed relative humidity by the humidity margin corresponds to a dewpoint margin, which is the amount that the dewpoint must be raised or lowered to compensate for expected errors in the sensed relative humidity, as set forth hereinbefore. The dewpoint margin, determination of which is graphically illustrated in FIG. 2B, is used hereinafter as a setpoint or parameter to control the HVAC system to prevent fogging and to scale a response to sensed fogging conditions.

In the tests conducted by the inventors, it was found that the fog predictability was 3%, the sensor accuracy was 5% and therefore the humidity margin was 8%. The humidity margin of 8% correlates to a dewpoint margin of 2.3° C. In tests, this dewpoint margin was rounded up to 3° C., and it was found that so long as the calculated windshield glass temperature was 3° C. or more than the dewpoint (derived from the lookup table of relative humidity verses cabin temperature), no fogging conditions developed.

Naturally, it is believed apparent that the fog predictability may need to be experimentally determined for each vehicle model in which the automatic defogging system of the present invention is to be implemented. Moreover, the sensor accuracy will also need to be determined, and may vary from manufacturer to manufacturer, between sensor models from the same manufacturer, and between different generations of the same sensor. However, assuming that these parameters remain fairly constant, once the dewpoint margin (sometimes referred to as the DPM hereinafter) is determined, it can be used as a setpoint or control parameter to desirably control operation of the HVAC system and, more specifically, the automatic defogging system and method of the present invention, as will be described hereinafter.

Figure 3:
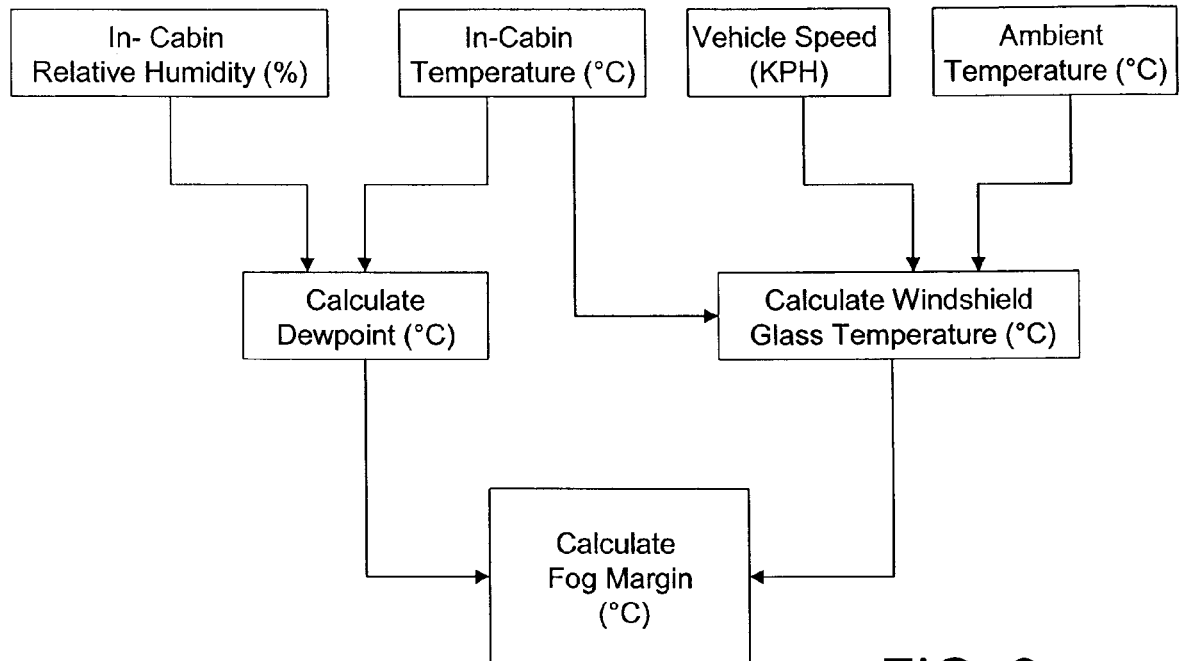
FIG. 3 is a flowchart illustrating a method of determining a fog margin based upon sensed conditions and predetermined relationships.
Figure 4:
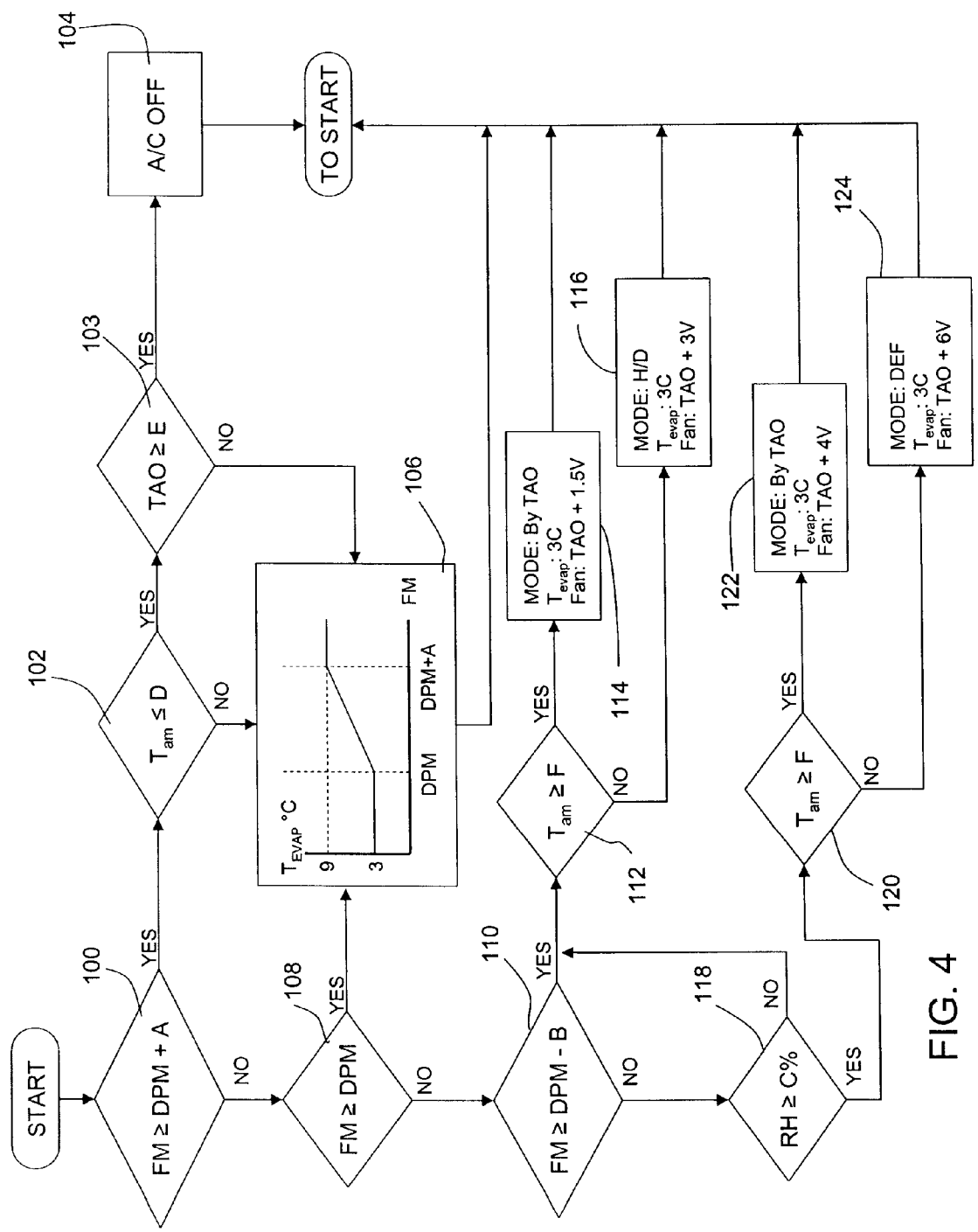
FIG. 4 is a flowchart showing the method of vehicle defogging condition control according to the present invention; and, FIG. 5 is a chart illustrating the relationship between fog margin, condensation or fog formation, HVAC operation, fan speed and vent control.
Figure 5:
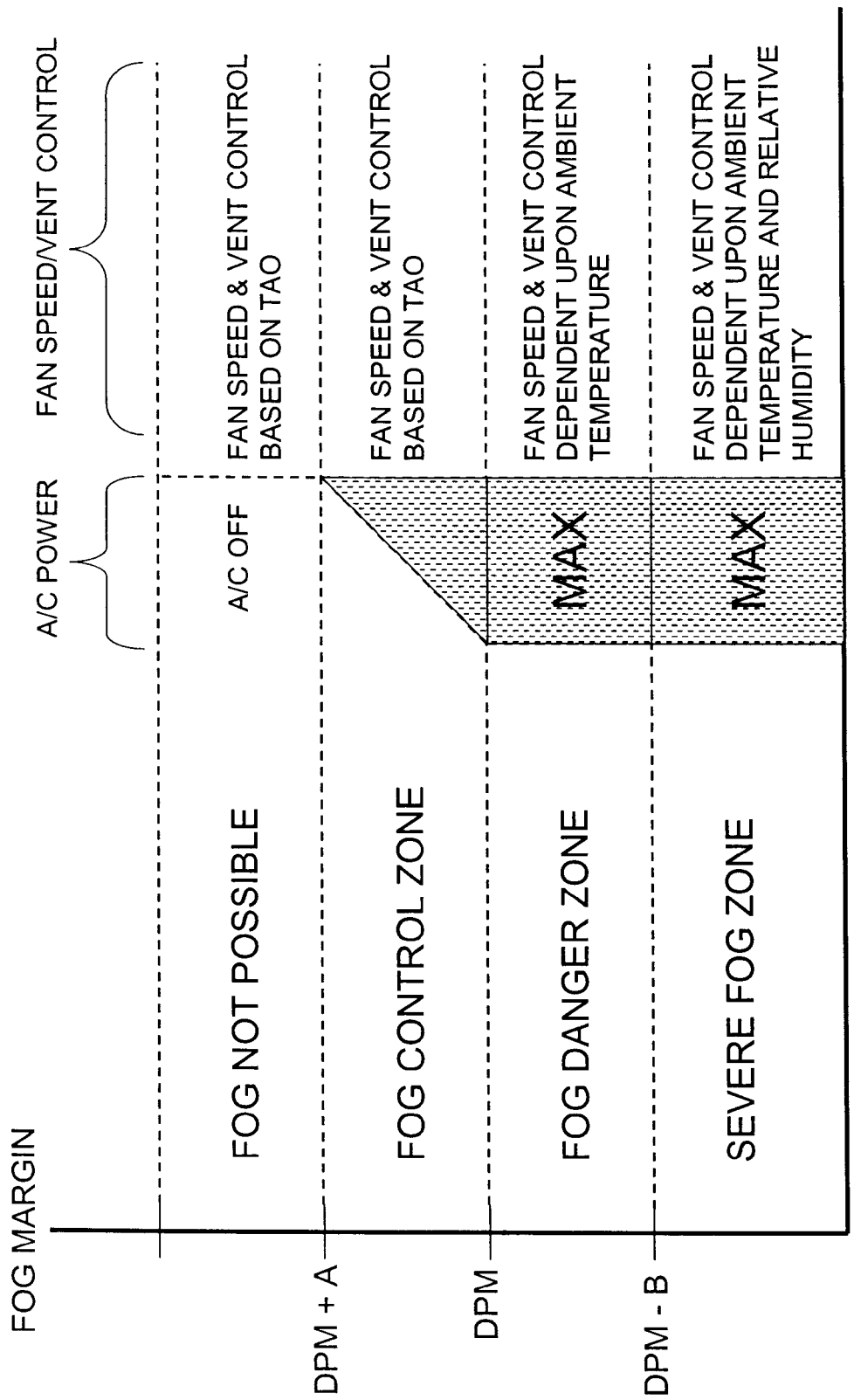

With reference to FIG. 4, a flow chart illustrating a control method based upon the present invention, as described in the foregoing, is provided. FIG. 5 is a related drawing that graphically depicts operation of the HVAC system at various fog margin levels. In the following, it is noted that the term fog margin is used, wherein the fog margin (FM) is determined based upon the equation:

Fog Margin=Windshield Glass Temperature−Dewpoint (2)

wherein windshield glass temperature is a function of ambient temperature and vehicle speed, described hereinbefore, and dewpoint is a function of in-cabin temperature and relative humidity, as illustrated graphically in FIG. 3 and described hereinbefore.

It is noted that in the following description, control over the air conditioning operation (A/C on/off and power setting; vent and fan control) is made in response to the calculated fog margin and is believed to provide better control over comfort levels within the cabin than is available by relying solely upon the sensed temperature. For example, using the fog margin as a control parameter prevents over-drying of the cabin air due to over-running of the air conditioning.

Initially, in step 100 it is determined if the fog margin is greater than the dewpoint margin plus a first predetermined amount (FM≧DPM+A). In other words, it is determined if the fog margin is a predetermined amount (° C.) greater than or equal to the dewpoint margin. If the answer is yes, then the fog margin is high, and there is no risk of fog.

Next, in step 102, it is determined whether the ambient air temperature ($T_{am}$) is less than or equal to a first predetermined temperature D.

If the ambient air temperature ($T_{am}$) is less than or equal to the first predetermined temperature D, then, in step 103, it is determined whether the temperature at the outlet of the HVAC vents (TAO) is greater than a second predetermined temperature E. In this regard it is noted that TAO is a calculated value of outlet temperature that is well known in the art and may be based upon a number of parameters, such as sensed cabin temperature, solar load, ambient temperature, etc., but is primarily based upon the desired cabin temperature setpoint input by the user.

It is also known in the art that the calculated outlet temperature TAO is commonly used in the automatic mode of operation to control fan speed and vent selection and, as will be seen in the following, this control setting is modified in some portions of the control system to provide for improved response. In the present case, if TAO is greater than the second predetermined temperature E, it is determined that no air conditioning is necessary for defogging purposes, the A/C is turned off (step 104), and the fan speed and vent selection are controlled by the HVAC controller in accordance with the TAO.

On the other hand, in step 103, if TAO is not greater than the second predetermined temperature E, the air conditioning operation, which is correlated to the evaporator temperature, is modulated between maximum power and minimum power based upon the fog margin according to a predetermined, preferably linear, relationship, which is graphically illustrated (step 106). According to the predetermined relationship, the air conditioning is operated at maximum power (i.e., minimum evaporator temp; $T_{evap}$=3° C.) when the fog margin (FM) is equal to the dewpoint margin (DPM). The air conditioning is operated at a minimum power (i.e., maximum evaporator temp; $T_{evap}$=9° C.) when the fog margin (FM) is equal to or greater than the dewpoint margin (DPM) plus the first predetermined amount (A); FM≧DMP+A. As illustrated, between FM=DPM and FM=DMP+A the evaporator temperature and, thus, air conditioning operation (power), linearly varies. In any event, in the current situation, since the fog margin is greater than the dewpoint margin plus the predetermined amount (as determined in step 100), the air conditioning is operated at a minimum power setting (e.g., maximum evaporator temperature; $T_{evap}$=9° C.).

Although not depicted in the graphical illustration of step 106, it is to be understood that in keeping with the full auto mode of operation, the fan speed and vent selection are determined by the HVAC controller in accordance with a predetermined relationship, which is a function of the calculated temperature at the outlet TAO.

Returning to step 102, if it is determined that the ambient temperature ($T_{am}$) is greater than the first predetermined temperature D then, in step 106, the air conditioning is controlled in accordance with the predetermined relationship described hereinbefore. Accordingly, since the fog margin has previously been determined to be greater than the dewpoint margin plus the predetermined amount A, the air conditioning is operated at a minimum power setting (evaporator temperature=9° C.). As noted previously, the fan speed and vent selection will be controlled by the HVAC controller in response to or as a function of the TAO.

Returning to step 100, if it is determined that the fog margin (FM) is not greater than or equal to the dewpoint margin (DPM) plus the predetermined amount then, in step 108, it is determined whether the fog margin is greater than or equal to the dewpoint margin (FM≧DPM). If the fog margin is greater than or equal to the dewpoint margin there is some risk of fog developing so action should be taken to prevent the fog or condensation ahead of time. Therefore, in step 106 the air conditioning is controlled in accordance with the predetermined relationship whereby the air conditioning power/evaporator temperature is correlated to the dewpoint margin. With reference to the previous description, and keeping in mind that the fog margin has been determined in steps 100 and 108 to be between the dewpoint margin and the dewpoint margin plus the predetermined amount A (i.e., DPM≦FM<DPM+A), the air conditioning system is operated at the corresponding setting between a maximum power setting (when FM=DPM) and a minimum power setting (when FM=DPM+A). As in the previous steps, fan speed and vent selection are controlled in accordance with the predetermined relationship to calculated temperature at the outlet (TAO).

On the other hand, if it is determined in step 108 that the fog margin is not greater than or equal to the dewpoint margin (i.e., FM<DPM) then there is an imminent risk of fog or condensation forming. More likely, fog or condensation may have already formed on the windshield glass. This situation may occur when the vehicle is first started or when automatic control is initiated after the vehicle has been operated for some time. Therefore, in the following steps the extent or intensity of the response to this fog threat is determined based upon the fog margin and ambient temperature.

In step 110 it is determined whether the fog margin is greater than the dewpoint margin less a second predetermined amount. If the fog margin is greater than the dewpoint margin less the second predetermined amount (i.e., DPM>FM>DPM−B), then, in step 112, it is determined whether the ambient temperature ($T_{am}$) is greater than a second predetermined ambient temperature (F). In this regard it is noted that the second predetermined ambient temperature is a rather low temperature, and takes into account the fact that the threat of condensation forming increases as the temperature decreases. Therefore, the system response depends upon whether the temperature is above or below the second predetermined ambient temperature (F).

If the ambient temperature is greater than or equal to the second predetermined ambient temperature ($T_{am} \geq F$), then the HVAC mode of operation (vent selection) is controlled in accordance with the predetermined relationship to the temperature at the outlet (TAO), while the fan is operated at a slightly increased speed (fan speed determined by TAO+1.5V) and the air conditioning is operated at maximum power ($T_{evap}=3°$ C.).

On the other hand, if the ambient temperature is less than the second predetermined ambient temperature ($T_{am}<F$), a more forceful or intense response is in order. Therefore, in step 116, the defrost and floor vents are activated (mode=H/D), the air conditioner is operated at maximum power ($T_{evap}=3°$ C.), and the fan is operated at a relatively higher speed (fan speed determined by TAO+3V).

Returning to step 110, if it is determined that the fog margin is not greater than or equal to the dewpoint margin less the second predetermined amount (i.e., FM<DPM−B), then, in step 118 it is determined whether the relative humidity is greater than or equal to a predetermined relative humidity value (RH≧C %).

In this regard, it is noted that the risk of significant fogging or condensation is small at low relative humidity levels. It is further noted that the relative humidity sensors have difficulty measuring or sensing particularly low humidity levels (i.e., below 10%). Therefore, the present invention limits the intensity of the HVAC response in low sensed humidity conditions.

Accordingly, if the relative humidity is smaller than the predetermined relative humidity value (i.e., RH<C %), the threat of condensation forming is judged to be relatively low even with the low fog margin, and the control passes to step 112 for determination of the appropriate HVAC response, described hereinbefore.

On the other hand, if the relative humidity is greater than or equal to the predetermined relative humidity value (C) then, in step 120, the ambient temperature ($T_{am}$) is compared to the second predetermined ambient temperature (F), like in step 112. However, since the fog margin is so low, and perhaps negative, a stronger or more intense response is necessary.

Therefore, if it is determined in step 120 that the ambient temperature is greater than or equal to the second predetermined ambient temperature, then, in step 122, the mode of operation is controlled by the temperature at the outlet (TAO), as described hereinbefore, while the fan is operated at a medium-high speed (speed determined by TAO+4V) and the air conditioning is operated at maximum power ($T_{evap}=3°$ C.). On the other hand, if it is determined in step 120 that the ambient temperature is less than the second predetermined ambient temperature, then, in step 124, the defrost vents are activated, the air conditioner is operated at maximum power ($T_{evap}=3°$ C.), and the fan is operated at a high speed setting (speed determined by TAO+6V).

Tests using the control logic set forth hereinbefore have been conducted by the inventors, and appropriate values for the predetermined amounts or values set forth hereinbefore have been determined. Namely, the dewpoint margin was equal to 3, as noted previously; the first predetermined amount A was equal to 8; the second predetermined amount B was equal to 4 (the dewpoint margin+1); the predetermined relative humidity value C was 11% (with it being noted that this value is preferably equal to or slightly larger than the lower sensitivity limit of the sensor); the first predetermined ambient temperature D was found to be 18° C.; the predetermined temperature at the outlet (TAO) E was equal to 12° C.; and the second predetermined ambient temperature F was equal to 8° C.

Naturally, these values will vary from vehicle to vehicle, and are not to be construed as limiting in any way. Rather, with the invention described herein, one skilled in the art will be able to recreate the automatic defog control of the present invention, and will substitute values that are appropriate, based upon simple experimentation, to the vehicle into which the control system is installed.

The present application discloses several related inventions that cooperate to permit a low cost, effective automatic defogging control system to be implemented based upon sensed conditions, calculated values, and predetermined values. For example, the application discloses a method and apparatus to calculate windshield glass temperature based upon the ambient temperature and vehicle speed; a method and apparatus to calculate a dewpoint margin based upon fog prediction accuracy and sensor accuracy, both of which are predetermined values; a method and apparatus for determining fog margin as a function of sensed in-cabin relative humidity and temperature and calculated windshield glass temperature; a method and apparatus for using fog margin to control HVAC operation and, more particularly, for adjusting the intensity of the HVAC response based upon the calculated fog margin; a method for offsetting the fog margin-based response by the calculated dewpoint margin; and, a method and apparatus for limiting the auto defog or HVAC response in low relative humidity situations to compensate for limitations of the relative humidity sensor.

Accordingly, it will be appreciated that the present application presents several inventions, each of which, based upon the disclosure provided herein, may be modified and/or customized without departing from the scope and spirit of the present invention. Accordingly, the foregoing disclosure is not to be interpreted in a limiting manner, but rather is only exemplary of the preferred embodiments of the inventions currently contemplated by the inventors. As such, the scope of the inventions are only to defined by the claims appended hereto.

What is claimed is:

1. A method for controlling a vehicle HVAC system, comprising the steps of:
   calculating a window temperature of a vehicle window in a vehicle;
   sensing a cabin temperature of air within a vehicle cabin of said vehicle;
   sensing relative humidity of air within said vehicle cabin with a relative humidity sensor, said relative humidity sensor having a predetermined sensor accuracy;

calculating a dewpoint based upon said sensed cabin temperature and said sensed relative humidity within said vehicle cabin;

determining a fog margin based upon said calculated window temperature and said calculated dewpoint, said fog margin being related to condensation formation on said vehicle window;

determining a fog predictability, which is a difference between a calculated relative humidity for condensation at a given temperature and a measured relative humidity for condensation at the given temperature;

calculating a humidity margin based upon said sensor accuracy and said fog predictability; and determining a dewpoint margin based upon said calculated dewpoint and said humidity margin;

wherein said HVAC system is operated in accordance with a predetermined algorithm based upon said fog margin, said sensed relative humidity, and said dewpoint margin.

2. The method according to claim 1, wherein calculating said window temperature includes:

measuring an ambient temperature of air surrounding said vehicle;

measuring a vehicle speed; and, calculating said window temperature based upon at least one of said measured vehicle speed and said measured ambient air temperature.

3. The method according to claim 2, wherein, if said cabin temperature is above a predetermined temperature, using said ambient air temperature as said window temperature.

4. A method for determining a value that is indicative of condensation forming on a vehicle window, said vehicle defining a vehicle cabin, the method comprising:

measuring a speed of said vehicle;

measuring a cabin temperature of air within said vehicle cabin;

measuring a relative humidity of air within said vehicle cabin;

measuring an ambient temperature of air surrounding said vehicle;

calculating a vehicle window temperature of said vehicle window; and calculating a dewpoint for air within said vehicle based upon said cabin temperature and said relative humidity of the air within said vehicle cabin;

wherein said value is derived from said vehicle window temperature and said dewpoint.

5. The method according to claim 4, wherein said cabin temperature and said relative humidity of air within said vehicle cabin are measured at a same location within said vehicle cabin.

6. The method according to claim 4, wherein calculating said vehicle window temperature includes:

determining whether said measured cabin temperature is above a predetermined temperature and, if said cabin temperature is above said predetermined temperature, setting said vehicle window temperature equal to said ambient temperature and, if said cabin temperature is below said predetermined temperature, said vehicle window temperature is a function of said ambient temperature and said vehicle speed.

7. The method according to claim 5, wherein calculating said vehicle window temperature includes:

determining whether said measured cabin temperature is above a predetermined temperature and, if said cabin temperature is above said predetermined temperature, setting said vehicle window temperature equal to said ambient temperature and, if said cabin temperature is below said predetermined temperature, said vehicle window temperature is a function of said ambient temperature and said vehicle speed.

8. A method for determining an adjusted dewpoint for air within a vehicle cabin of a vehicle, said method comprising:

measuring a temperature of the air within the vehicle cabin;

measuring a relative humidity of air within said vehicle cabin using a relative humidity sensor, said relative humidity sensor having a sensor accuracy;

determining a fog predictability, which is a difference between a calculated relative humidity for condensation at a given temperature and said measured relative humidity for condensation at the given temperature;

determining a humidity margin based upon said sensor accuracy and said fog predictability;

calculating a dewpoint for air within said vehicle based upon the measured temperature and said measured relative humidity of the air within said vehicle cabin; and adjusting said calculated dewpoint based upon said humidity margin to arrive at the adjusted dewpoint.

9. A method for calculating a window glass temperature of a window glass within a vehicle, comprising:

measuring a vehicle speed;

measuring a temperature of ambient air outside said vehicle; and calculating the window glass temperature based upon said measured vehicle speed and said measured ambient air temperature.

10. The method according to claim 9, further comprising measuring air temperature within a cabin of said vehicle; and, if said cabin air temperature is above a predetermined temperature, using said ambient air temperature as the window glass temperature.

* * * * *